(12) United States Patent
Bucking

(10) Patent No.: US 10,119,417 B2
(45) Date of Patent: Nov. 6, 2018

(54) TURBINE-END BEARING SUPPORT AND COOLING SYSTEM

(71) Applicant: BorgWarner Inc., Auburn Hills, MI (US)

(72) Inventor: Michael Bucking, Asheville, NC (US)

(73) Assignee: BorgWarner Inc., Auburn Hills, MI (US)

( * ) Notice: Subject to any disclaimer, the term of this patent is extended or adjusted under 35 U.S.C. 154(b) by 395 days.

(21) Appl. No.: 14/898,483

(22) PCT Filed: Jun. 25, 2014

(86) PCT No.: PCT/US2014/043996
§ 371 (c)(1),
(2) Date: Dec. 15, 2015

(87) PCT Pub. No.: WO2015/002774
PCT Pub. Date: Jan. 8, 2015

(65) Prior Publication Data
US 2016/0130976 A1 May 12, 2016

Related U.S. Application Data

(60) Provisional application No. 61/841,640, filed on Jul. 1, 2013.

(51) Int. Cl.
F01D 25/26 (2006.01)
F01D 25/16 (2006.01)
(Continued)

(52) U.S. Cl.
CPC .......... F01D 25/162 (2013.01); F01D 25/16 (2013.01); F01D 25/18 (2013.01); F01D 25/24 (2013.01);
(Continued)

(58) Field of Classification Search
CPC ........ F01D 25/162; F01D 25/24; F01D 25/18; F01D 25/16; F02C 7/06; F05D 2240/54;
(Continued)

(56) References Cited

U.S. PATENT DOCUMENTS 4,902,144 A * 2/1990 Thoren ................. F01D 25/166
384/287
5,246,352 A 9/1993 Kawakami
(Continued)

FOREIGN PATENT DOCUMENTS

KR 20110117968 A 10/2011

OTHER PUBLICATIONS

Written Opinion and International Search Report in International Application No. PCT/US2014/043996 dated Oct. 31, 2014.

Primary Examiner — Dwayne J White
Assistant Examiner — Adam W Brown
(74) Attorney, Agent, or Firm — Eric L. Doyle; Stephan A. Pendorf; Patent Central LLC

(57) ABSTRACT

A turbocharger (300) having a rotatable shaft (312) passing through a bearing housing (303) with a turbine-end bearing support (580) with a support bar (600). A turbine-end bearing support (580) may include the support bar (600) with radial supports (610) and (620) connected to each opposite side (492) and (494) of cavity (496) of the bearing housing (303) wherein oil can flow in recesses (640) and (650) above the radial supports (610) and (620). Each radial support (610) and (620) of the support bar (600) is preferably integrated in the corresponding side (492) and (494). A turbine-end bearing support (580) may also include the support bar (600) with a rod portion (622) forming a bottom tie support bar (612) that supports the bottoms of both bearing supports (490) and (580), which are top-supported
(Continued)

by the bearing housing (303). Each support bar (600) is preferably integral with the bearing support (580).

11 Claims, 8 Drawing Sheets

(51) Int. Cl.
*F02C 7/06* (2006.01)
*F01D 25/18* (2006.01)
*F01D 25/24* (2006.01)
*F16C 35/02* (2006.01)

(52) U.S. Cl.
CPC ............ *F02C 7/06* (2013.01); *F05D 2220/40* (2013.01); *F05D 2240/24* (2013.01); *F05D 2240/54* (2013.01); *F05D 2240/60* (2013.01); *F16C 35/02* (2013.01); *F16C 2360/24* (2013.01)

(58) Field of Classification Search
CPC ............ F05D 2240/60; F05D 2240/24; F05D 2220/40; F16C 2360/24; F16C 35/02
See application file for complete search history.

(56) References Cited

U.S. PATENT DOCUMENTS

| | | | | |
|---|---|---|---|---|
| 5,993,173 A * | 11/1999 | Koike | ................... | F01D 25/166 417/407 |
| 6,155,720 A * | 12/2000 | Battig | ..................... | F16C 27/02 384/99 |
| 7,401,980 B2 * | 7/2008 | Krauss | .................. | F01D 25/168 384/112 |
| 7,766,550 B2 * | 8/2010 | Larue | ...................... | F16C 27/02 384/119 |
| 8,292,507 B2 * | 10/2012 | Hirai | ....................... | F01D 25/16 384/117 |
| 8,985,857 B2 * | 3/2015 | Schmidt | ................ | F01D 25/125 384/475 |
| 9,068,473 B2 * | 6/2015 | House | ..................... | F01D 25/16 |
| 9,068,598 B2 * | 6/2015 | House | ..................... | F01D 25/16 |
| 9,091,208 B2 * | 7/2015 | Petitjean | ................ | F01D 25/14 |
| 9,328,628 B2 * | 5/2016 | Schenkenberger | ... | F01D 25/162 |
| 9,400,012 B2 * | 7/2016 | Iwata | ...................... | F16C 17/02 |
| 9,470,240 B2 * | 10/2016 | Uneura | ................. | F04D 29/057 |
| 9,822,812 B2 * | 11/2017 | Ryu | ....................... | F16C 17/03 |
| 2010/0132358 A1 | 6/2010 | Purdey et al. | | |
| 2010/0196148 A1 | 8/2010 | Gee et al. | | |
| 2013/0028731 A1 * | 1/2013 | Mimura | ................. | F16C 17/03 415/229 |

* cited by examiner

TURBINE-END BEARING SUPPORT AND COOLING SYSTEM

CROSS-REFERENCE TO RELATED APPLICATION

This application claims priority to and all benefits of U.S. Provisional Application No. 61/841,640, filed on Jul. 1, 2013, and entitled "Turbine-End Bearing Support and Cooling System."

BACKGROUND

Field of the Disclosure

This disclosure relates to turbochargers having a rotatable shaft passing through a bearing housing between a turbine housing and a compressor housing. More particularly, this disclosure relates to a turbine-end bearing support with an extending support bar within the bearing housing.

Description of Related Art

Advantages of turbocharging include increased power output, lower fuel consumption and reduced pollutant emissions. The turbocharging of engines is no longer primarily seen from a high-power performance perspective, but is rather viewed as a means of reducing fuel consumption and environmental pollution on account of lower carbon dioxide ($CO_2$) emissions. Currently, a primary reason for turbocharging is using exhaust gas energy to reduce fuel consumption and emissions. In turbocharged engines, combustion air is pre-compressed before being supplied to the engine. The engine aspirates the same volume of air-fuel mixture as a naturally aspirated engine, but due to the higher pressure, thus higher density, more air and fuel mass is supplied into a combustion chamber in a controlled manner. Consequently, more fuel can be burned, so that the engine's power output increases relative to the speed and swept volume.

In exhaust gas turbocharging, some of the exhaust gas energy, which would normally be wasted, is used to drive a turbine. The turbine includes a turbine wheel that is mounted on a shaft and is rotatably driven by exhaust gas flow. The turbocharger returns some of this normally wasted exhaust gas energy back into the engine, contributing to the engine's efficiency and saving fuel. A compressor, which is driven by the turbine, draws in filtered ambient air, compresses it, and then supplies it to the engine. The compressor includes a compressor impeller that is mounted on the same shaft so that rotation of the turbine wheel causes rotation of the compressor impeller.

Turbochargers typically include a turbine housing connected to the engine's exhaust manifold, a compressor housing connected to the engine's intake manifold, and a center bearing housing coupling the turbine and compressor housings together. The bearing housing encloses and supports the rotating shaft.

This disclosure focuses on bearing housing design. Bearing housings are typically cast with a hollow core forming a cavity that allows flowing oil to lubricate and cool the bearing housing and the rotating shaft. The general oil flow through the bearing should, whenever possible, be vertical from top to bottom. The lubricating oil flows into the turbocharger at a pressure of approximately four bar. As the oil drains off at low pressure, the oil drain pipe diameter must be larger than the oil inlet pipe. An obstruction in the oil drain pipe can result in drain cavity oil flooding and resultant back pressure in the bearing system.

The rotating shaft is typically support by cradles in the bearing housing. Journal bearings are stronger and can take more abuse than dual ball bearing. Typically, twin journal bearings are used, including one on the turbine end, which is the preferred bearing system in this disclosure. Oil is transported through a passageway to the journal bearing at the turbine end and through another passageway to another journal bearing closer to the compressor housing. Pressurized oil can be provided through an oil intake and through a passageway to the thrust bearing, and oil making its way toward the compressor can be blocked by an insert and a sealing system between the bearing housing and the compressor housing as shown in BorgWarner's U.S. Pat. No. 8,348,595, which is incorporated herein by reference. The lack of proper turbine end bearing support could cause shaft motion failures.

Existing top-supported cradle designs are shown in FIGS. 1 through 3 wherein the rotating shaft in a bearing system is engaged with a turbine-end support extending down from the top of the bearing housing cavity. There can be issues with stress in the cooling dam area with certain top-supported cradle designs. Cooling of the turbine-end bearing support is a primary concern with efficient bearing housing designs.

Introducing air dams and air cooling in addition to optimized oil cooling presents challenges in shaft motion prevention design and with journal bearing support cradle stiffness.

Thus, there is a need for a turbocharger with a modified turbine-end bearing support and improved cooling capabilities.

SUMMARY

This disclosure relates to a high-efficiency turbine-end, support bar design for the bearing support and a cooling system with enhanced oil flow in the bearing housing. These designs optimize bearing support and journal bearing cooling. Also, they address casting stiffness and support in the bearing housing around the turbine-end journal bearing area.

A turbocharger has a rotatable shaft passing through a bearing housing with a turbine-end bearing support with a support bar that extends from the bearing support. The turbine-end bearing support may include the support bar with radial supports connected to each opposite side of a cavity of the bearing housing wherein oil can flow in recesses above the radial supports. Each radial support of the support bar is preferably integrated in the corresponding side of the cavity. In a variation, the turbine-end bearing support may include the support bar with a rod portion forming a bottom tie support bar that supports the bottom of two bearing supports, which are also top-supported by the bearing housing. Each support bar is preferably integral with the turbine-end bearing support.

The disclosed radial support design has a turbine-end support including radial integral connections, such as a support bar with radial supports, with the sides of the cavity of the bearing housing. A stiff support bar can extend from both ends of the bearing support to the sides of the cavity with a large area around the spacer cavity.

Similarly, a support bar can extend from a turbine-end bearing support cradle to the rear bearing support closer to the compressor end in the bearing housing. With the bottom tie support bar design, both bearing supports are supported from the top and bottom.

Displacement and stiffness are improved with the fully supported radial support design and the bottom tie support bar design. Displacement from shaft loading is improved. Radial supports connected to the sides of the cavities improve stiffness, and the bottom tie support bar improves stiffness by connecting both bearing supports at each bottom distal end, as well as being supported from the top where extending from the bearing housing.

The fully supported radial design allows for a large area around the spacer cavity, and the bottom tie support bar design has a large area around the shaft spacer for oil settling. Oil flow can circulate around the bearing support above the radial supports extending to the sides of the cavity. The bottom tie support bar design also optimizes oil flow around the turbine-end bearing support and maintains a thermal boundary.

BRIEF DESCRIPTION OF THE DRAWINGS

Advantages of the present disclosure will be readily appreciated as the same becomes better understood by reference to the following detailed description when considered in connection with the accompanying drawings wherein.

DETAILED DESCRIPTION OF THE EMBODIMENTS

Figure 1:
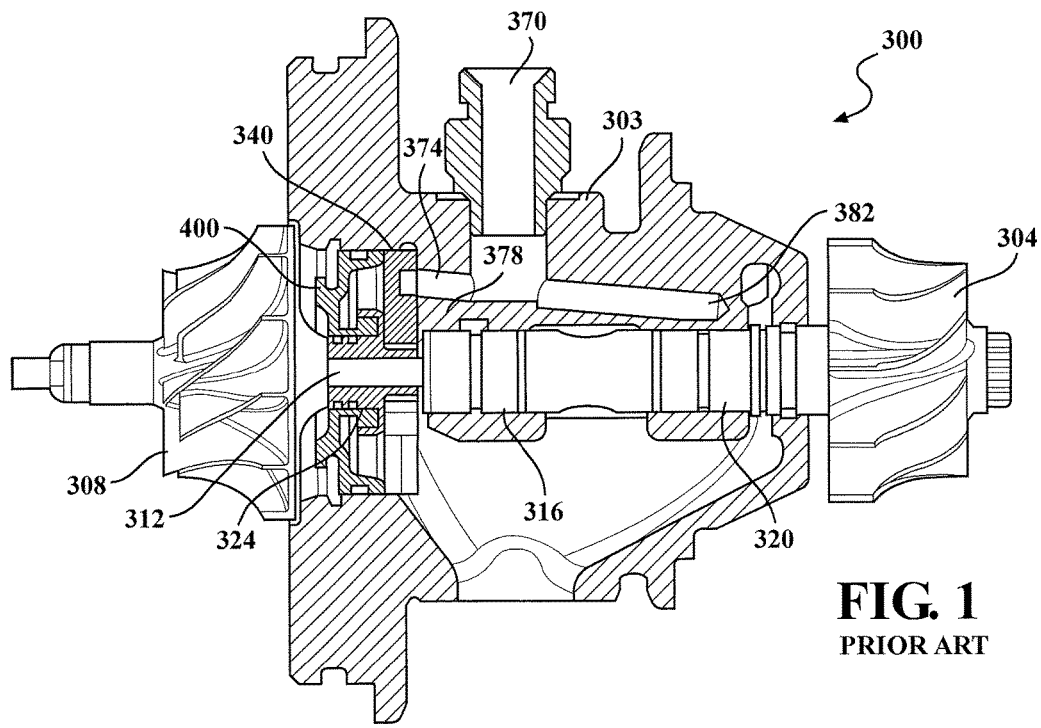
FIG. 1 is a vertical right cross-sectional view of a prior art turbocharger with a bearing housing with a top-supported bearing support on the turbine end.

A turbocharger 300 is generally known and includes a turbine and a compressor, wherein a compressor wheel 308 is rotatably driven via a shaft 312 by a turbine wheel 304. The rotatable shaft 312 passes through a bearing housing 303 between a turbine housing and a compressor housing.

FIG. 1 from U.S. Pat. No. 8,348,595 shows a prior art turbocharger 300 with a turbine wheel 304 and a compressor wheel 308 that are connected by the shaft 312. The shaft 312 is supported by a first journal bearing 316 and a second journal bearing 320 in the bearing housing 303. On the compressor end, an insert 400 annularly surrounds at least a portion of a thrust collar 324.

Pressurized oil can be provided through an oil intake 370 and through a passageway 374 to a thrust bearing 340. Oil is transported through a passageway 378 to the first journal bearing 316 and through a passageway 382 to the second journal bearing 320 on the turbine end.

Figure 2:
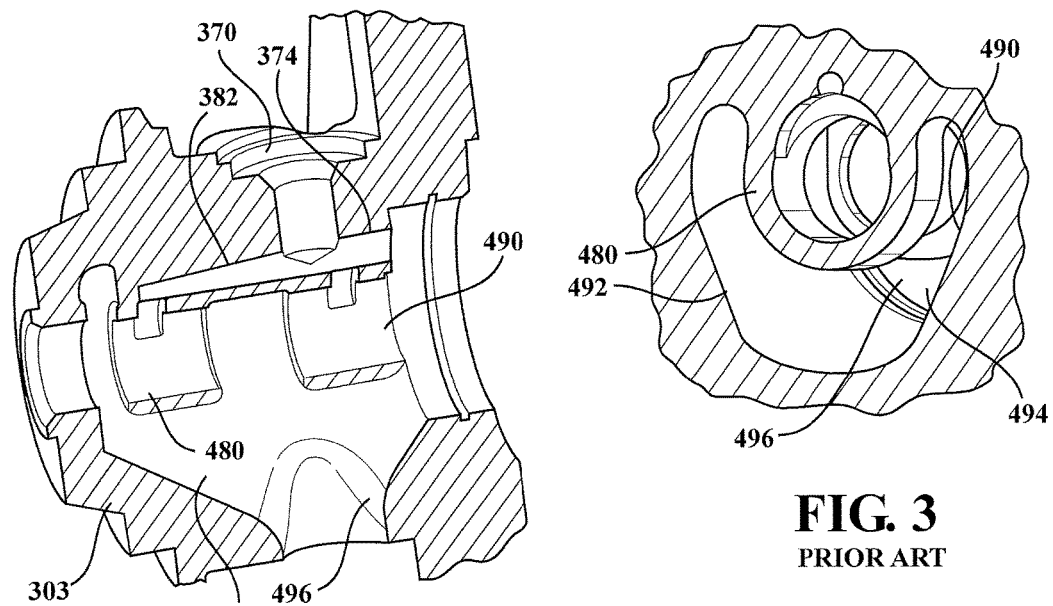
FIG. 2 is a left vertical cross-sectional view of another prior art bearing housing with a top-supported bearing support on the turbine end.
Figure 3:
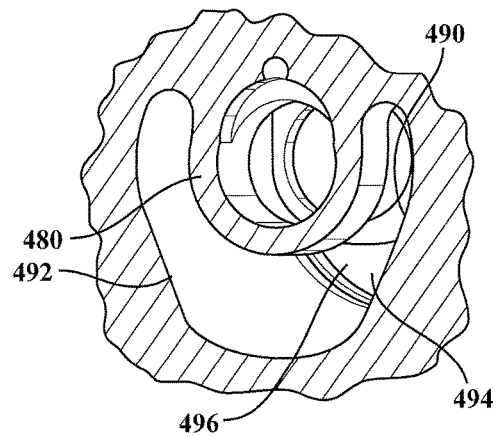
FIG. 3 is a cross-sectional view of a prior art bearing housing of FIG. 2 through the top-supported bearing support on the turbine end.
Figure 4:
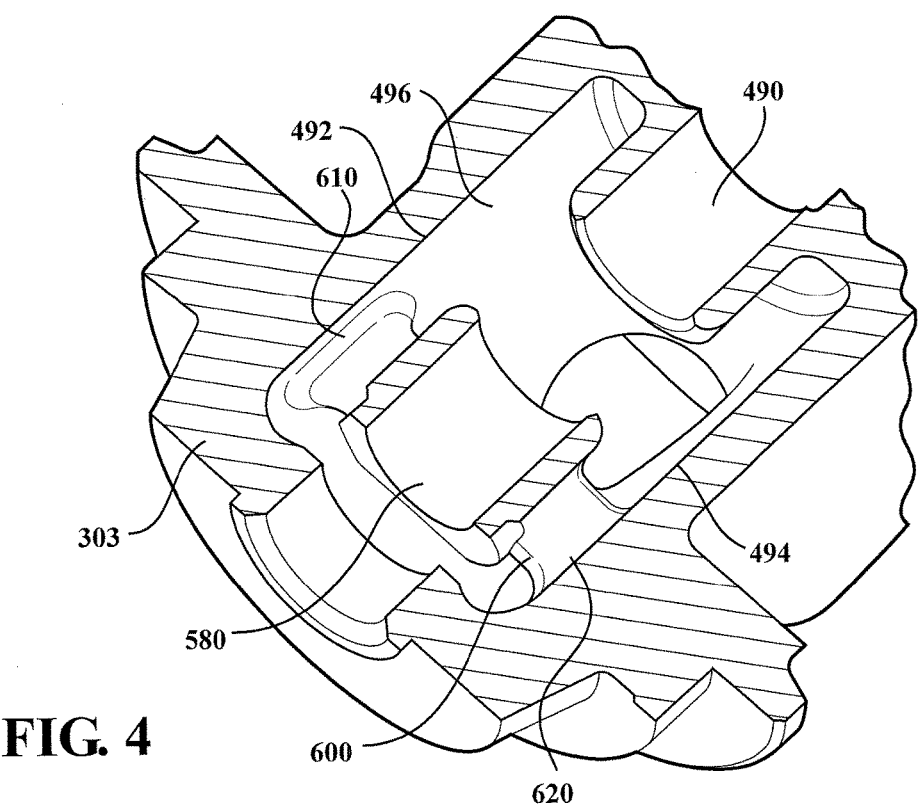
FIG. 4 is horizontal cross-sectional view of a bearing housing according to an exemplary embodiment of the present disclosure with radial supports on the support bar.
Figure 5:
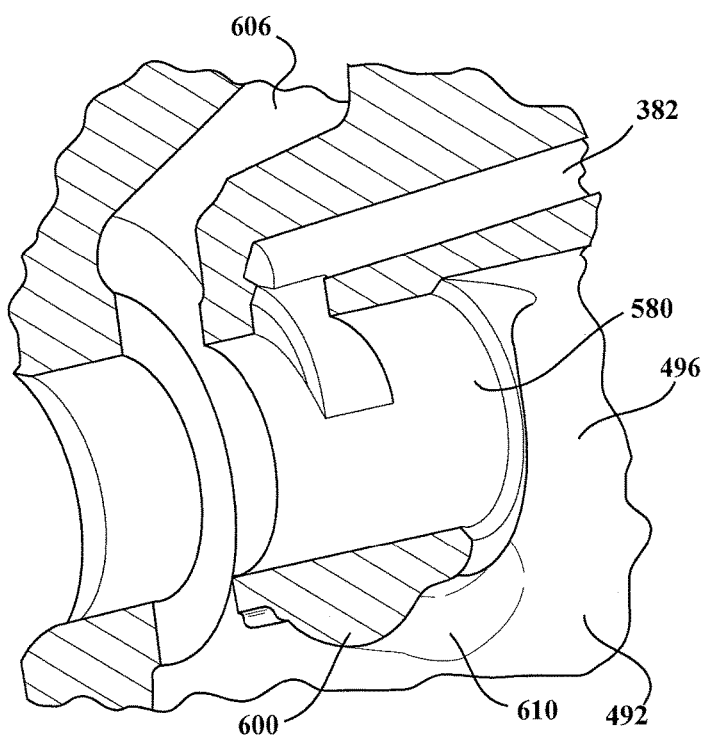
FIG. 5 is a vertical right cross-sectional view of a portion of the bearing housing of FIG. 4.
Figure 6:
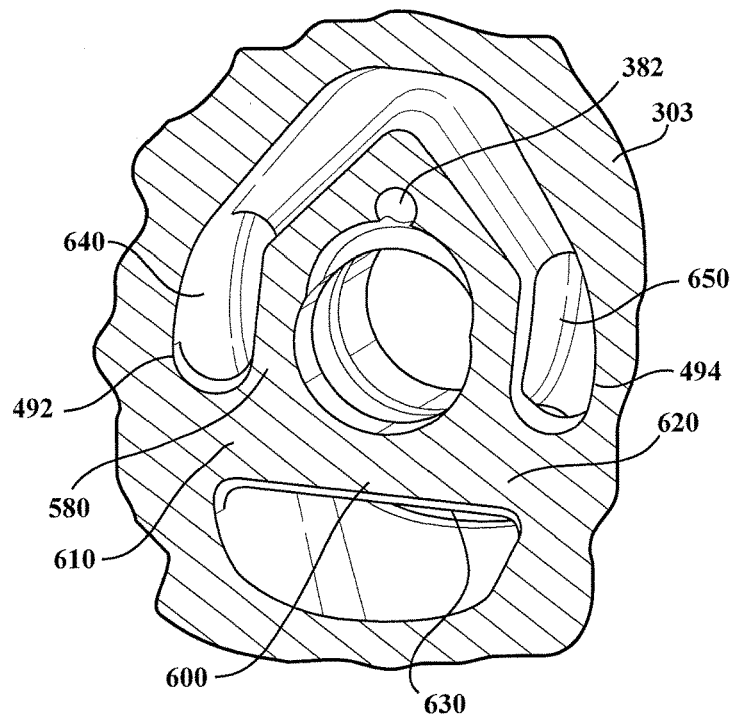
FIG. 6 is a cross-sectional view of the bearing housing through the support bar.

FIG. 2 shows another prior art bearing housing 303 with a top-supported bearing support 480 on the turbine end and a bearing support 490 toward the compressor end. The exclusively top supported design can have stress in the cooling dam area (approximate center of half portion shown) without supports to either side 492 and 494 of the cavity 496 of the bearing housing 303. FIG. 3 shows a cross-sectional view through the top-supported bearing support 480 on the turbine end without supports to the sides 492 and 494 of the cavity 496 or to the other bearing support 490.

FIGS. 4 through 8 show a support bar 600 beneath the enhanced bearing support 580 on the turbine end with radial supports 610 and 620 connected to each respective opposite side 492 and 494 of the cavity 496 of the bearing housing 303. A portion of the support bar 600 with its radial supports 610 and 620 preferably forms a substantially planar portion 630 opposite from the base of the bearing support 580. The support bar 600 is preferably integrated into the bearing support 580 as part of a molding process. Similarly, radial supports 610 and 620 of the support bar 600 are preferably each integral with respective side 492 and 494 of the cavity 496. A cavity portion 606 in the bearing housing 303 may extend above and substantially around the turbine-end bearing support 580.

Figure 7:
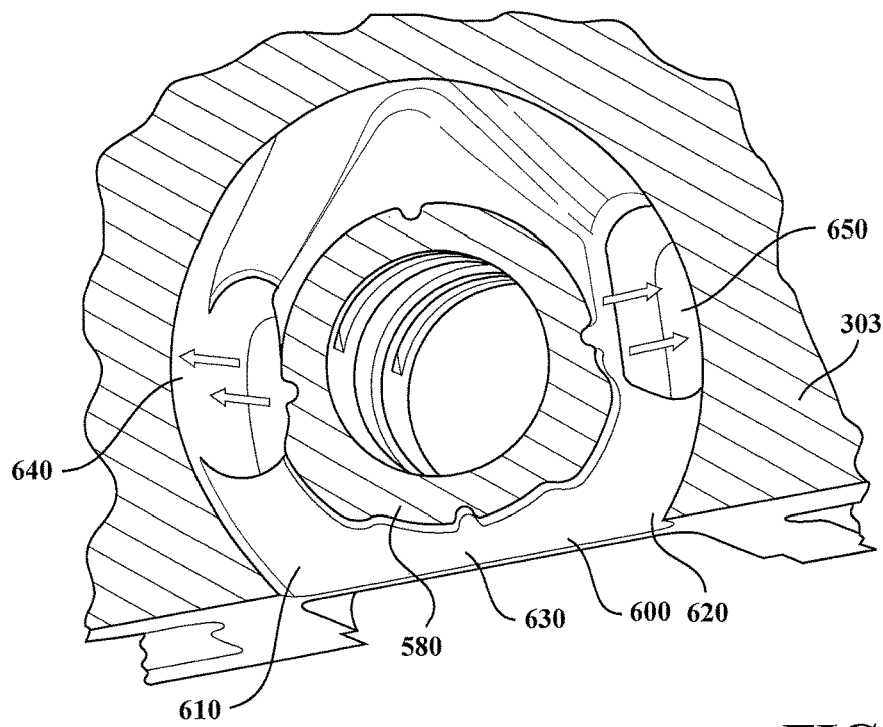
FIG. 7 is a cross-sectional view of the bearing housing through a portion immediately adjacent to the support bar with arrows indicating oil flow.
Figure 8:
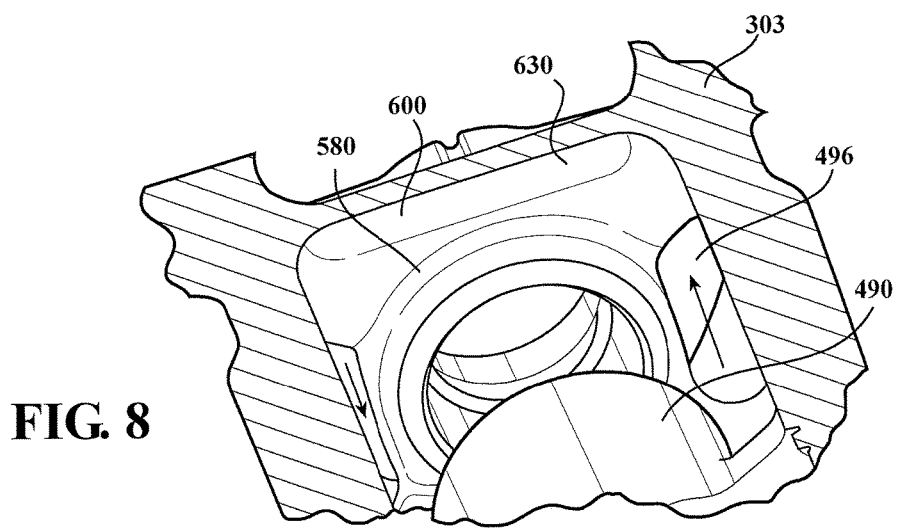
FIG. 8 is a perspective view of the bearing housing with arrows indicating oil flow adjacent to the radial supports of the support bar.

Recesses 640 and 650 are formed as part of the cavity 496 above the radial supports 610 and 620 adjacent to the bearing support 580. FIGS. 7 and 8 show the flow path of oil around the radial support design through recesses 640 and 650. Oil is meant to flow in opposite directions around the bearing support 580 for cooling of the bearing support 580 and the associated portion of the rotating shaft 312. A portion of the cavity 496 is also preferably below substantially planar portion 630.

Figure 9:
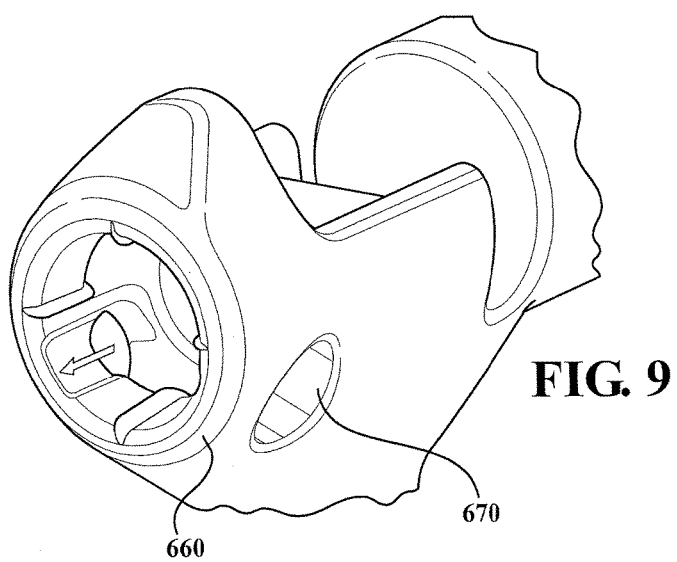
FIG. 9 is a perspective view of a core of a bearing housing with a radial support bar.
Figure 10:
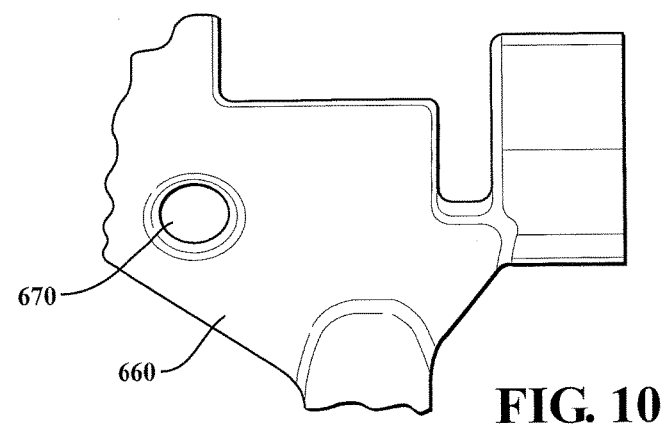
FIG. 10 is a side view of the core of the bearing housing with a support bar.

FIGS. 9 and 10 show an example core 660 for a bearing housing 303 with a support bar 600. The core 660 forms the shape of the cavity 496 of the bearing housing 303. On the turbine end, a recess 670 in the core 660 would form radial supports 610 and 620. Cores are known to create shapes in a molding process for flow in the molding process, and the resulting cavity 496 is designed for flow of oil within the bearing housing 303.

FIGS. 11 through 16 show a support bar 600 as a bottom tie support bar 612 with a rod portion 622 that connects the distal end of the bearing support 580 on the turbine end with another bearing support 490 for another bearing, such as a preferred journal bearing 316.

FIGS. 11 through 16 show a support bar 600 beneath the bearing support 580 on the turbine end with a rod portion 622 extending and connected to the other bearing support 490. A portion of the support bar 600 and its rod portion 622 preferably form a substantially planar portion 630 opposite from the base of the bearing support 580 where the top is connected to the bearing housing 303. The support bar 600 at the ends of the rod portion 622 is preferably integrated into both bearing support 580 and bearing support 490 as part of a molding process. A cavity portion 606 in the bearing housing 303 may extend above and substantially around the turbine-end bearing support 580.

The top and bottom support of the bearing supports 490 and 580 provide strength to allow for a cavity portion 606 in the bearing housing 303 extending above the turbine-end bearing support 580. This cavity portion 606 can have cooling benefits for the bearing support 580 and associated bearings, such as a preferred second journal bearing 320.

Figure 14:
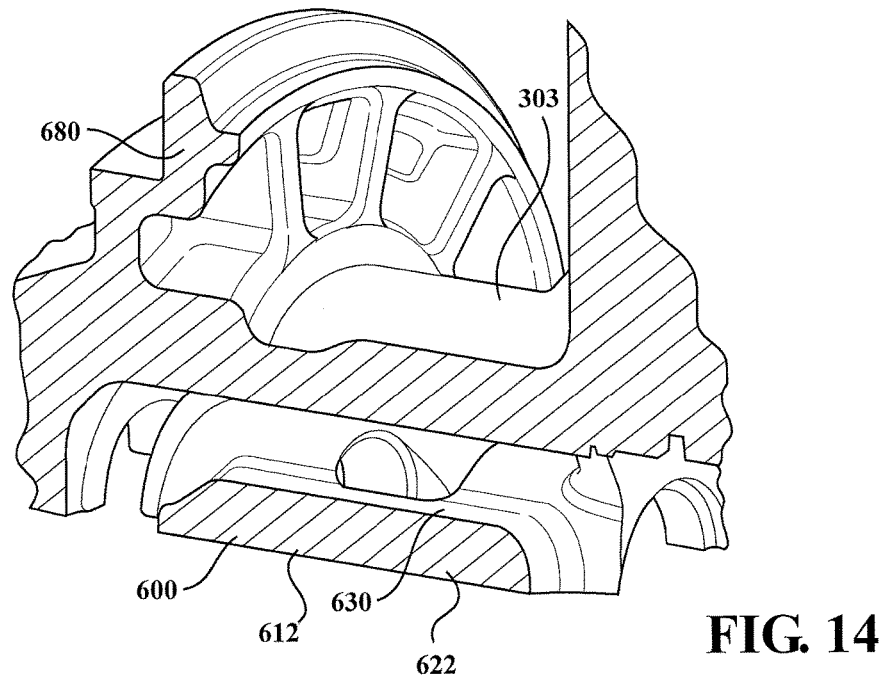
FIG. 14 is a cross-sectional view of a bottom tie bar design with an optimized turbine-end flange.
Figure 15:
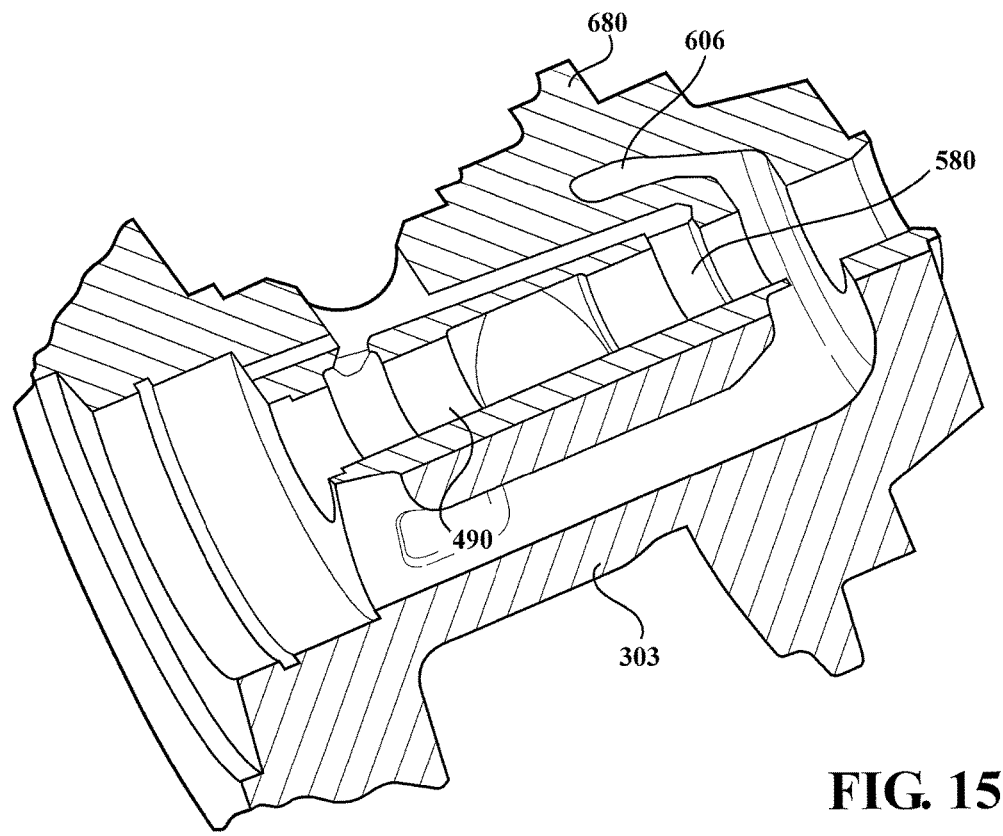
FIG. 15 is a horizontal cross-sectional view of the bottom tie bar design with an optimized turbine-end flange.

FIGS. 14 and 15 show the tie bar design with an optimized turbine-end flange 680. The shape, crevices, and recesses allow greater area for cooling.

Figure 11:
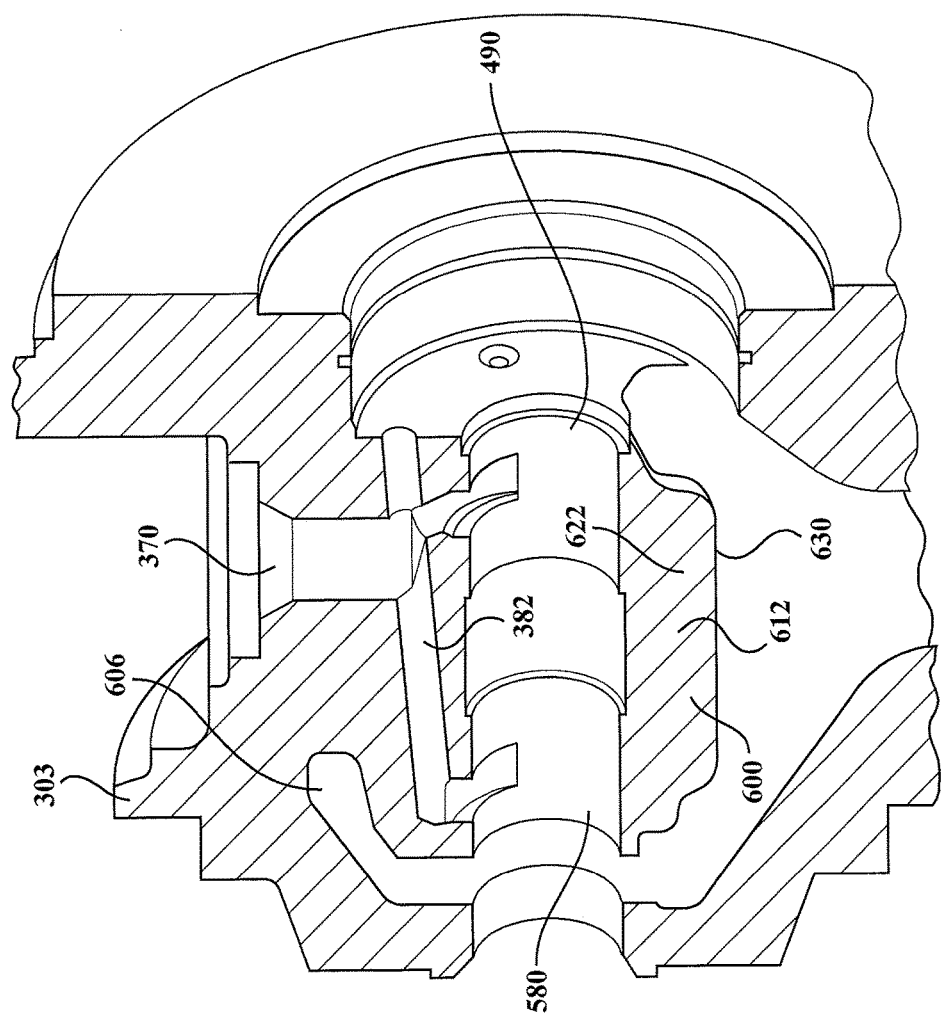
FIG. 11 is a vertical cross-sectional view of a bearing housing with a bottom tie support bar.
Figure 12:
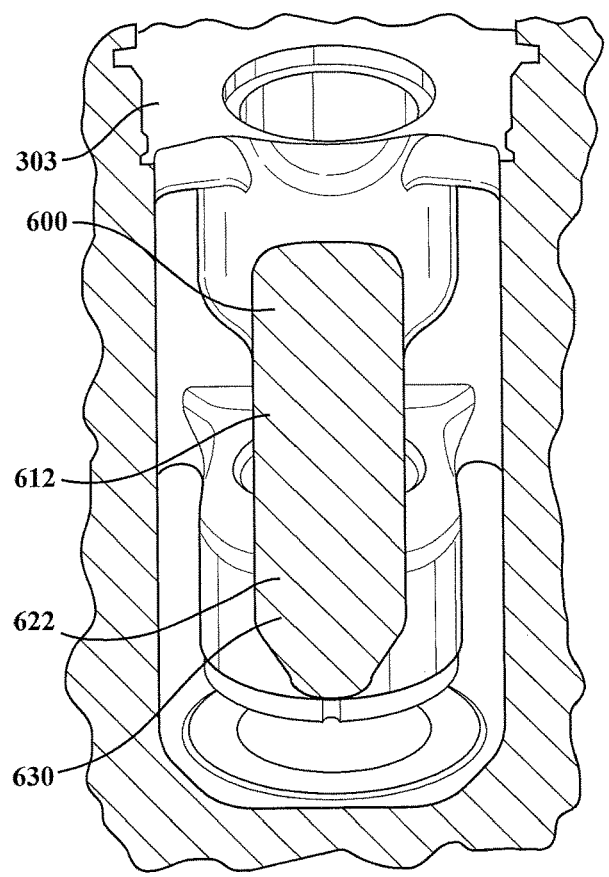
FIG. 12 is a cross-sectional bottom view of the bottom tie support bar wherein the rod portion forms a substantially planar portion.
Figure 13:
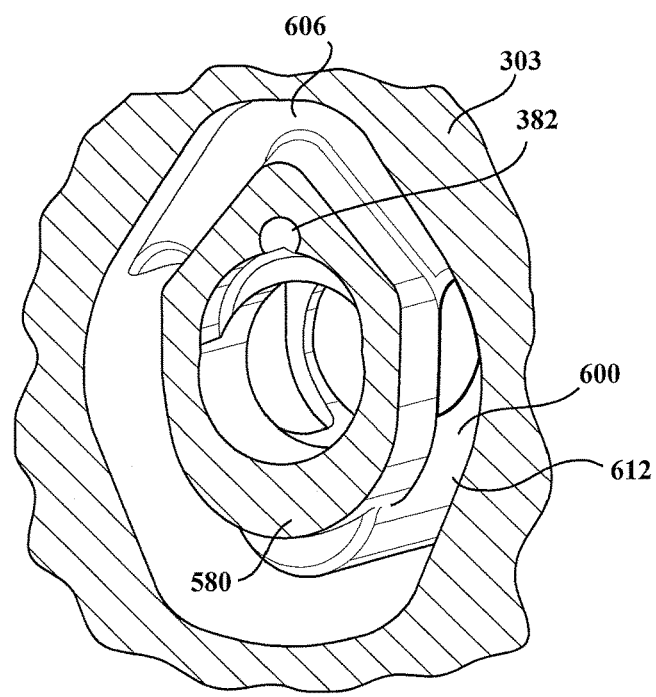
FIG. 13 is a cross-sectional view of the bearing housing through the turbine-side bearing support.
Figure 16:
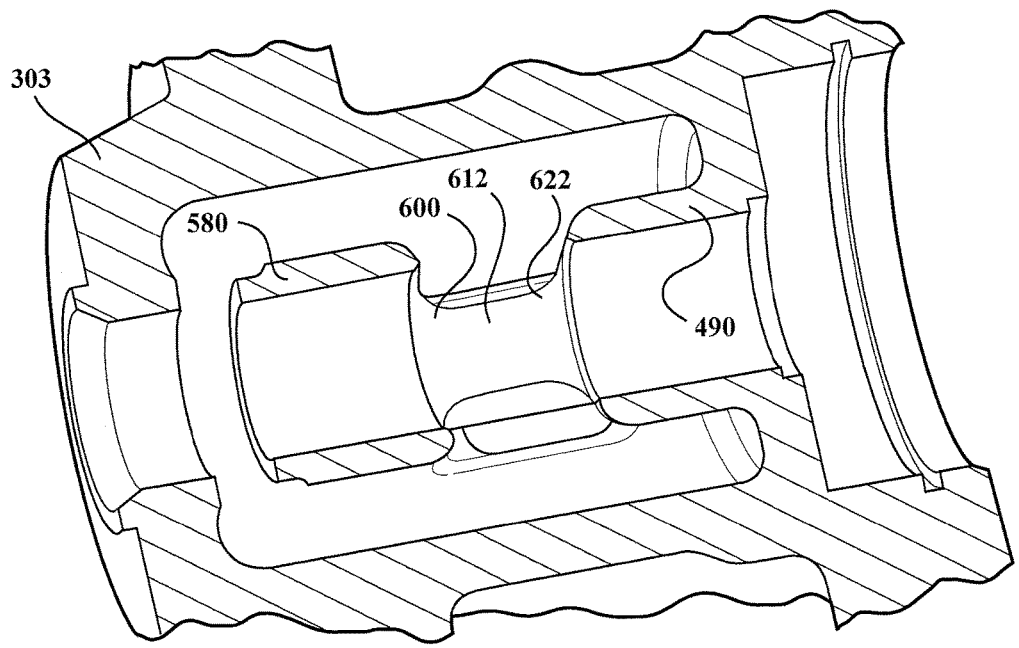
FIG. 16; is a horizontal cross-sectional view showing the bottom support of the bearing supports by a rod portion of the bottom tie support bar.

FIG. 16 shows the rod portion 622 connecting the bearing support 580 to the other bearing support 490 while still leaving an open area on each side between the bearing supports 490 and 580. The bottom support of the bearing supports 490 and 580 adds stiffness and support particularly to the turbine-end bearing support 580, but both bearing supports 490 and 580 are supported on the top as connected to the bearing housing 303 as shown in FIGS. 11 and 13.

Figure 17:
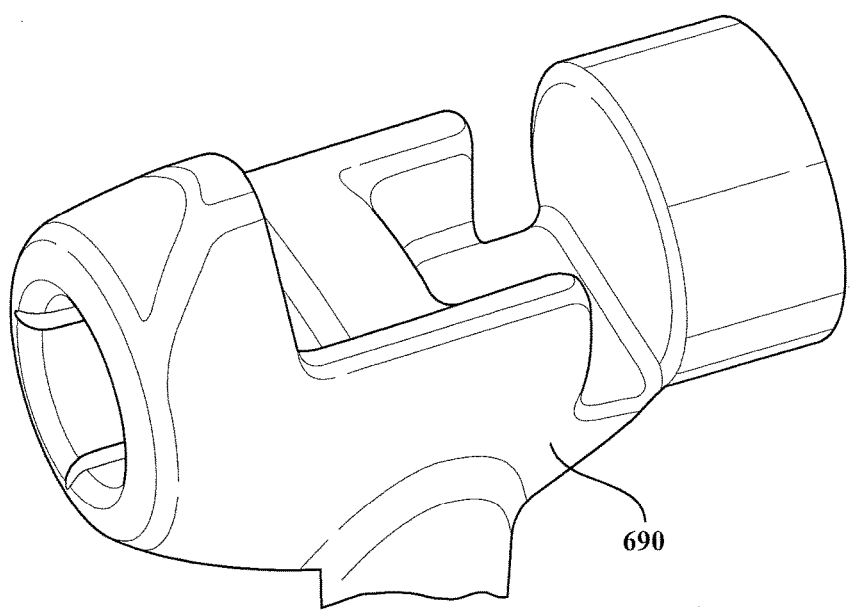
FIG. 17 is a perspective view of a core of a bearing housing with a bottom tie bar design.

FIG. 17 shows an example core 690 for a bearing housing 303 with a support bar 600 as a bottom tie support bar 612. The core 690 forms the shape of the cavity 496 of the bearing housing 303.

The invention has been described in an illustrative manner, and it is to be understood that the terminology used is intended to be in the nature of words of description rather than limitation. Many modifications and variations of the present invention are possible in light of the above teachings. It is, therefore, to be understood that within the scope of the appended claims, the invention may be practiced other than as specifically enumerated within the description.

What is claimed is:

1. A turbocharger (300) having a rotatable shaft (312) passing through a bearing housing (303), the bearing housing having a turbine end and a compressor end and comprising:
   a turbine-end bearing support (580) for supporting a journal bearing of the rotatable shaft (312) in the bearing housing (303), the turbine-end bearing support including a support bar (600) having radial supports (610, 620) extending from the turbine-end bearing support (580) and connected respectively to opposite sides (492, 494) in a cavity (496) of the bearing housing (303) wherein oil can flow in recesses (640, 650) of the cavity (496) above the radial supports (610, 620) adjacent to the bearing support (580).

2. The turbocharger of claim 1 wherein the support bar (600) is integral with the turbine-end bearing support (580) and the radial supports (610, 620) of the support bar (600) are each integral with the respective side (492, 494).

3. The turbocharger of claim 1 further comprising a compressor-end bearing support (490) for a compressor-end journal bearing (316) wherein the turbine-end bearing support (580) supports a turbine-end journal bearing (320) in the bearing housing (303).

4. The turbocharger of claim 1 wherein a portion of the support bar (600) with its radial supports (610, 620) forms a substantially planar portion (630) above a portion of the cavity (496).

5. The turbocharger of claim 1 wherein a cavity portion (606) in the bearing housing (303) extends above the turbine-end bearing support (580).

6. A turbocharger (300) having a rotatable shaft (312) passing through a bearing housing (303) (303), the bearing housing having a turbine end and a compressor end and comprising:
   a turbine-end journal bearing support (580) supporting a turbine end journal bearing (320) for the rotatable shaft (312) in the bearing housing (303) with a support bar (600) having radial supports (610, 620) integral with opposite sides (492, 494) of a cavity (496) of the bearing housing (303) wherein oil can flow in recesses (640, 650) above the radial supports (610, 620) adjacent to the journal bearing support (580), and
   a compressor-end journal bearing support (490) supporting a compressor-end journal bearing (316) for the rotatable shaft (312).

7. A turbocharger (300) having a rotatable shaft (312) passing through a bearing housing (303), the bearing housing having a turbine end and a compressor end and comprising: a turbine-end bearing support (580) for supporting a journal bearing of the rotatable shaft (312) in the bearing housing (303), the turbine-end bearing support including a support bar (600) having radial supports (610, 620) extending from the turbine-end bearing support (580) and connected respectively to opposite sides (492, 494) in a cavity (496) of the bearing housing (303) or rod portion (622) integral with and extending from a distal end of the turbine-end bearing support (580) extending from the bearing housing (303).

8. The turbocharger (300) of claim 7 wherein the support bar (600) has radial supports (610, 620) connected to each opposite sides (492, 494) in a cavity (496) of the bearing housing (303) wherein oil can flow in recesses (640, 650) of the cavity (496) above the radial supports (610, 620), wherein each radial support (610, 620) of the support bar (600) is integral with the corresponding side (492, 494).

9. The turbocharger (300) of claim 7 wherein the rod portion (622) forms a bottom tie support bar (612) that supports a bottom of the turbine-end bearing support (580) and a bottom of another bearing support (490), and the bearing supports (580, 490) are also top-supported by the bearing housing (303).

10. The turbocharger (300) of claim 9 wherein the rod portion (622) of the support bar (600) forms a substantially planar portion (630) above a portion of the cavity (496).

11. The turbocharger of claim 7 wherein a cavity portion (606) in the bearing housing (303) extends above the turbine-end bearing support (580).

* * * * *